(12) United States Patent
Baek et al.

(10) Patent No.: US 12,031,998 B2
(45) Date of Patent: Jul. 9, 2024

(54) HOLDER STRUCTURE FOR SENSOR AND SENSOR FOR DETECTING CHANGE OF MAGNETIC FIELD

(71) Applicant: HL MANDO CORPORATION, Pyeongtaek (KR)

(72) Inventors: Sung Oh Baek, Suwon (KR); Jong Sik Song, Uiwang (KR)

(73) Assignee: HL MANDO CORPORATION, Pyeongtaek (KR)

( * ) Notice: Subject to any disclaimer, the term of this patent is extended or adjusted under 35 U.S.C. 154(b) by 181 days.

(21) Appl. No.: 17/703,993

(22) Filed: Mar. 25, 2022

(65) Prior Publication Data

US 2022/0308081 A1    Sep. 29, 2022

(30) Foreign Application Priority Data

Mar. 26, 2021  (KR) .......................... 10-2021-0039446

(51) Int. Cl.
  *G01P 3/44*    (2006.01)
  *G01P 1/02*    (2006.01)

(52) U.S. Cl.
  CPC ................ *G01P 3/44* (2013.01); *G01P 1/026* (2013.01)

(58) Field of Classification Search
  CPC .................................. G01P 1/026; G01P 3/44
  USPC ......................................................... 73/493
  See application file for complete search history.

(56) References Cited

FOREIGN PATENT DOCUMENTS

| JP | 2007-170964 A | 7/2007 | |
|---|---|---|---|
| JP | 2015-169468 A | 9/2015 | |
| JP | 2020-112406 A | 7/2020 | |
| KR | 10-0777708 B1 | 11/2007 | |
| KR | 100777708 B1 * | 11/2007 | ............... G01P 1/02 |
| KR | 100777708 B1 | 11/2007 | |
| KR | 10-1341588 B1 | 12/2013 | |
| KR | 101341588 B1 * | 12/2013 | ............... G02B 6/38 |
| KR | 10-2088360 B1 | 3/2020 | |
| KR | 102088360 B1 * | 3/2020 | ............. G01P 3/488 |

OTHER PUBLICATIONS

Translation of KR-102088360-B1 (Year: 2020).*
Translation of KR-101341588-B1 (Year: 2013).*
Translation of KR-100777708-B1 (Year: 2007).*

* cited by examiner

*Primary Examiner* — Nathaniel T Woodward
(74) *Attorney, Agent, or Firm* — Harvest IP Law, LLP

(57) ABSTRACT

A holder structure for a sensor and a sensor for detecting a change in the magnetic field including the same are provided. The holder structure for a sensor according to an exemplary embodiment of the present disclosure may include a body which is elongated; a sensor unit seating part formed at one end of the body in the longitudinal direction; a cable seating part formed at the other end of the body in the longitudinal direction; a first fixing part having a first protrusion formed to protrude from one side of the body, and a first groove concavely formed on a front-end surface of the first protrusion; and a second fixing part having a second protrusion formed to protrude from the other side of the body, and a second groove concavely formed on a front-end surface of the second protrusion.

15 Claims, 10 Drawing Sheets

HOLDER STRUCTURE FOR SENSOR AND SENSOR FOR DETECTING CHANGE OF MAGNETIC FIELD

CROSS-REFERENCE TO RELATED APPLICATION

This application claims priority to and the benefit of Korean Patent Application No. 10-2021-0039446, filed on Mar. 26, 2021, the disclosure of which is incorporated herein by reference in its entirety.

TECHNICAL FIELD

The present disclosure relates to a holder structure for a sensor and a sensor for detecting a change in the magnetic field including the same.

BACKGROUND ART

The wheel speed sensor of a vehicle is a sensor capable of measuring the speed of a vehicle by measuring a change in the magnetic field generated as a permanent magnet disposed on the wheel of the vehicle rotates together with the wheel.

In order to prevent foreign substances that may be generated according to the rotation of the wheel and foreign substances that may rise due to friction between the wheel and the ground from flowing into the housing of a wheel speed sensor, the housing is integrally formed by injection in the wheel speed sensor while the sensor unit connected to the cable is seated in the holder structure for a sensor.

In this case, in order to inject the housing, the holder structure for a sensor is fixed by a separate fixing member, and since the fixing member is formed symmetrically, the direction in which the holder structure for a sensor is fixed can be reversed by the operator's negligence.

When the housing is injected in a state where the arrangement direction of the holder structure for a sensor is not correct, a loss occurs because the holder structure for a sensor cannot be separated again and the housing cannot be injected again due to the characteristics of the integral injection-molded housing.

In addition, even when the holder structure for a sensor is incorrectly arranged, if it can be coupled to a separate fixing member, there is a problem in that it is difficult to prevent the loss, even if an automated production facility is used.

Accordingly, the situation is that there is a need for the holder structure for a sensor, which can be coupled to a fixing member only when it is arranged in a specific direction when disposing the holder structure for a sensor for housing injection such that the holder structure for a sensor can be prevented from being injected in an erroneously arranged state.

RELATED ART DOCUMENTS

Patent Documents (Patent Document 0001) Korean Registered Patent Laid-Open No. 10-0777708 (Manufacturing Method of Wheel Speed. Sensor for Vehicle)

DISCLOSURE

Technical Problem

It is an object of the present disclosure to provide a holder structure for a sensor which is capable of reducing the production of defective products by disposing the holder structure for a sensor inside a housing in the same direction when the housing is injected, and a sensor for detecting a change in the magnetic field including the same.

It is another object of the present disclosure to provide a holder structure for a sensor in which a sensor unit can be firmly seated in the holder structure for a sensor, and a sensor for detecting a change in the magnetic field including the same.

The problems of the present disclosure are not limited to the problems mentioned above, and other problems that are not mentioned will be clearly understood by those skilled in the art from the following description.

Technical Solution

The holder structure for a sensor according to an aspect of the present disclosure, in which a sensor unit is seated on one end and a pair of cables connected to the sensor unit are seated on the other end, may include: a body which is elongated; a sensor unit seating part formed at one end of the body in the longitudinal direction such that the sensor unit is seated; a cable seating part formed at the other end of the body in the longitudinal direction such that the pair of cables connected to the sensor unit to be energized are seated; a first fixing part having a first protrusion formed to protrude from one side of the body, and a first groove concavely formed on a front-end surface of the first protrusion; and a second fixing part having a second protrusion formed to protrude from the other side of the body, and a second groove concavely formed on a front-end surface of the second protrusion and having a cross-section which is different from the cross-section of the first groove.

In this case, the sensor unit may include a sensor body, a pair of terminals formed to extend from one side of the sensor body to which the pair of cables are respectively connected, and a through hole formed in the terminals, and the body may include a terminal fixing protrusion formed to protrude from one side such that the sensor unit is seated in the sensor unit seating part while being coupled to the through hole.

In this case, the sensor unit may further include a body fixing protrusion formed to protrude from the other side of the sensor body, and the sensor unit seating part may include an edge wall formed to surround the edge of the sensor body and a body fixing protrusion groove formed in the edge wall such that the sensor unit can be seated with the body fixing protrusion inserted.

In this case, the sensor body may be formed asymmetrically, and the edge wall may be formed to correspond to the asymmetric shape of the sensor body such that the sensor body can be seated in the sensor unit seating part only in one direction.

In this case, the cable seating part may include a pair of side walls protruding from the body and extending in the longitudinal direction of the body, and a separation wall protruding from the body to be disposed in the center of the pair of side walls and extending in the longitudinal direction, and the separation wall may include a plurality of cable fixing ribs formed to protrude from both sides toward the pair of side walls In this case, the cable seating part may include a pair of side walls protruding from the body and extending in the longitudinal direction of the body, and a separation wall protruding from the body to be disposed in the center of the pair of side walls and extending in the longitudinal direction, and the pair of side walls may include a plurality of cable fixing ribs formed to protrude from the inner side toward the separation wall.

In this case, the holder structure may further include a protection member fixing member for fixing a protection member formed to surround the pair of cables with one end of the pair of cables exposed to the outside to the other side of the body.

In this case, the protection member fixing member may be opened in a direction where the cable is seated such that the protection member is seated in the protection member fixing member in a direction where the cable is seated in the cable seating part.

In this case, the protection member fixing member may further include a pair of protrusions protruding inward from both ends of the open side of the protection member fixing member.

In this case, a guide surface for guiding the protection member toward the open side of the protection member fixing member may be formed on the pair of protrusions.

In this case, the holder structure may further include a third fixing part having a third protrusion spaced apart from the first protrusion and formed to protrude from one side of the body, and a third groove concavely formed on a front-end surface of the third protrusion; and a fourth fixing part having a fourth protrusion spaced apart from the second protrusion and formed to protrude from the other side of the body, and a fourth groove concavely formed on a front-end surface of the fourth protrusion and having a cross-section which is different from the cross-section of the third groove.

Meanwhile, the sensor for detecting a change in the magnetic field having the holder structure for a sensor according to an aspect of the present disclosure may include a sensor unit for detecting a change in the magnetic field; a pair of cables connected to the sensor unit to be energized; a holder structure for a sensor in which the sensor unit and the pair of cables are seated; and a housing in which the holder structure for a sensor is disposed, wherein the holder structure for a sensor may include a body which is elongated; a sensor unit seating part formed at one end of the body in the longitudinal direction such that the sensor unit is seated; a cable seating part formed at the other end of the body in the longitudinal direction such that the pair of cables are seated; a first fixing part having a first protrusion formed to protrude from one side of the body, and a first groove concavely formed on a front-end surface of the first protrusion; and a second fixing part having a second protrusion formed to protrude from the other side of the body, and a second groove concavely formed on a front-end surface of the second protrusion and having a cross-section which is different from the cross-section of the first groove.

In this case, in the housing, an end of the first fixing member extending in length and having a cross-section corresponding to the cross-section of the first groove portion may be coupled to the first fixing part and extending in length, and an end of the second fixing member having a cross-section corresponding to the cross-section of the second groove may be formed by injection while being coupled to the second fixing part.

In this case, the holder structure for a sensor may further include a third fixing part having a third protrusion spaced apart from the first protrusion and formed to protrude from one side of the body, and a third groove concavely formed on a front-end surface of the third protrusion; and a fourth fixing part having a fourth protrusion spaced apart from the second protrusion and formed to protrude from the other side of the body, and a fourth groove concavely formed on a front-end surface of the fourth protrusion and having a cross-section which is different from the cross-section of the third groove, wherein in the housing, a first fixing member extending in length and having a cross-section corresponding to the first groove may be coupled to the first fixing part, and a second fixing member extending in length and having a cross-section corresponding to the second groove may be coupled to the second fixing part, and a third fixing member spaced apart from the first fixing member and extending in length and having a cross-section corresponding to the third groove may be coupled to the third fixing portion, and a fourth fixing member spaced apart from the second fixing member and extending in length and having a cross-section corresponding to the fourth groove may be formed by injection while being coupled to the fourth fixing member.

In this case, the sensor unit may measure the wheel speed of a vehicle.

Advantageous Effects

In the holder structure for a sensor according to an exemplary embodiment of the present disclosure and a sensor for detecting a change in the magnetic field including the same, the holder structure for a sensor is disposed in the same direction inside a housing when the housing is injected, thereby reducing the production of defective products.

Further, in the holder structure for a sensor according to an exemplary embodiment of the present disclosure and a sensor for detecting a change in the magnetic field including the same, the sensor unit may be firmly seated in the holder structure for a sensor.

The effects of the present disclosure are not limited to the above effects, but it should be understood to include all effects that can be inferred from the configurations of the present disclosure described in the description or claims of the present disclosure.

MODES OF THE INVENTION

Hereinafter, with reference to the accompanying drawings, exemplary embodiments of the present disclosure will be described in detail such that those of ordinary skill in the art can easily practice the present disclosure. The present disclosure may be embodied in many different forms and is not limited to the exemplary embodiments described herein. In addition, the singular expression includes the plural expression unless the context clearly dictates otherwise. Unless otherwise defined, terms used in the exemplary embodiments of the present disclosure may be interpreted as meanings commonly known to those of ordinary skill in the art.

In order to clearly describe the present disclosure in the drawings, parts that are irrelevant to the description are omitted, and the same reference numerals are assigned to the same or similar components throughout the specification.

Hereinafter, the expression "connection" includes not only being directly connected, but also being connected indirectly through another configuration. Terms such as 'first' and 'second' may be used to describe various elements, but the elements should not be limited by the above terms. The above terms may be used only for the purpose of distinguishing one component from another.

The present disclosure provides a holder structure for a sensor capable of reducing the production of defective products by preventing a change in the direction in which the holder structure for a sensor is fixed when a housing is injected by designing the shapes of a first fixing part and a second fixing part differently, and a sensor for detecting a change in the magnetic field including the same.

In particular, in an exemplary embodiment of the present disclosure, the holder structure for a sensor may be a holder structure for a sensor capable of fixing the sensor unit of a sensor for detecting a change in the magnetic field capable of measuring the wheel speed of a vehicle. Hereinafter, for the convenience of description, the present disclosure will be described by defining a wheel speed sensor capable of measuring the speed of a vehicle wheel.

Figure 1:
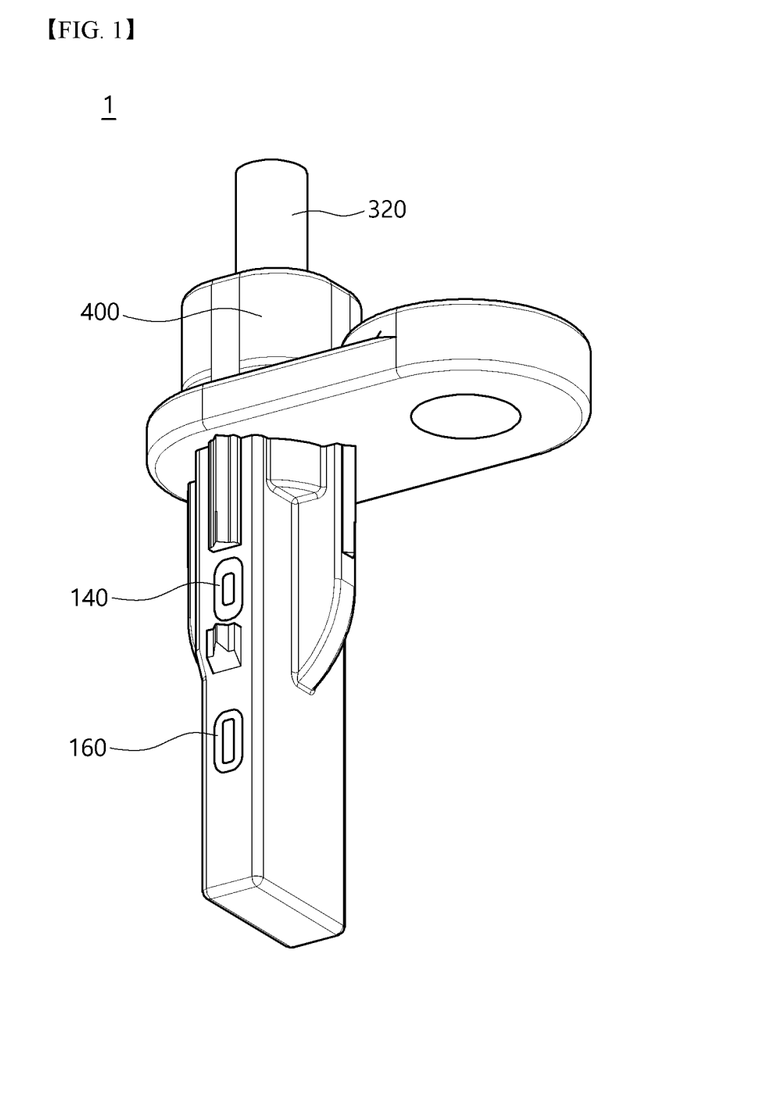
FIG. 1 is a perspective view of a sensor for detecting a change in the magnetic field including the holder structure for a sensor according to an exemplary embodiment of the present disclosure.
Figure 2:
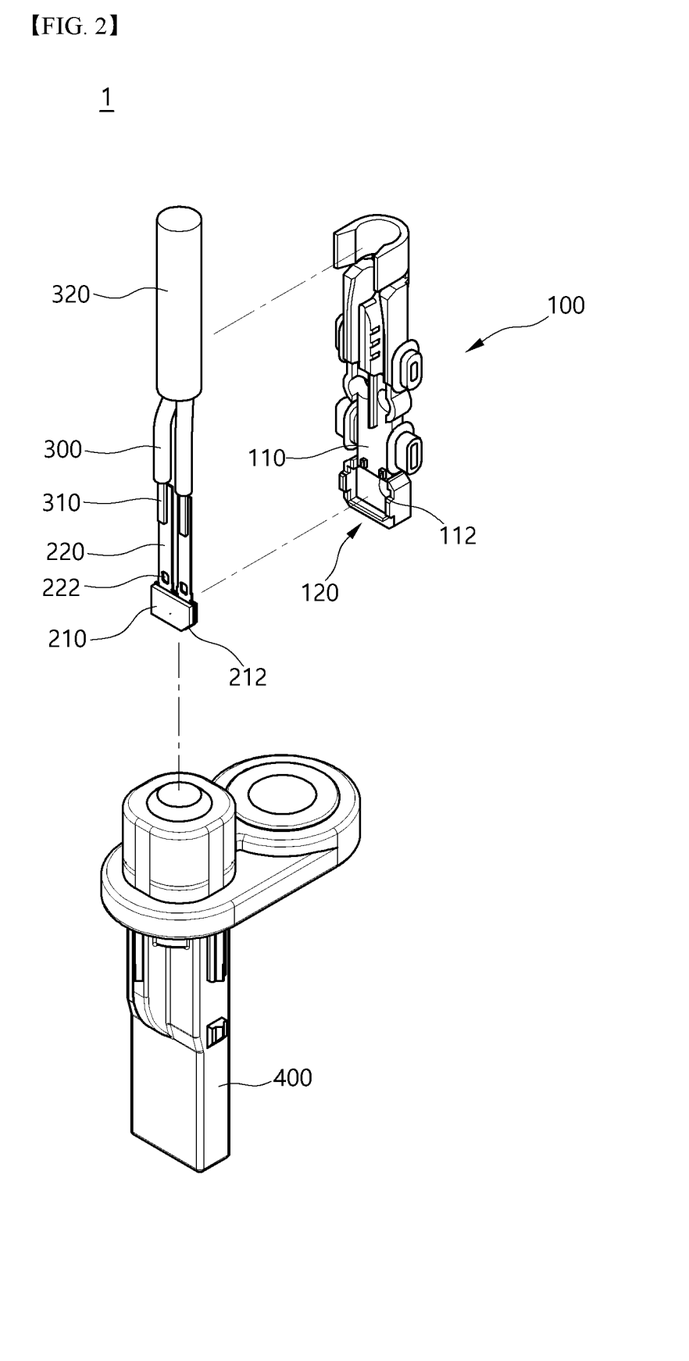
FIG. 2 is an exploded perspective view of a sensor for detecting a change in the magnetic field including the holder structure for a sensor according to an exemplary embodiment of the present disclosure.

FIG. 1 is a perspective view of a sensor for detecting a change in the magnetic field including the holder structure for a sensor according to an exemplary embodiment of the present disclosure. FIG. 2 is an exploded perspective view of a sensor for detecting a change in the magnetic field including the holder structure for a sensor according to an exemplary embodiment of the present disclosure. In this case, the downward direction in FIG. 1 is defined as the forward direction, and the leftward direction is defined as the upper direction.

As illustrated in FIG. 1, the sensor for detecting a change in the magnetic field 1 including the holder structure 100 for a sensor according to an exemplary embodiment of the present disclosure includes a holder structure for a sensor 100, a sensor unit 200, a cable 300 and a housing 400.

The sensor unit 200 detects a change in the magnetic field. In particular, it is possible to measure a change in the magnetic field that is changed by a permanent magnet that is disposed inside the wheel of a vehicle and is attached to the wheel (not illustrated) of the vehicle and rotates together with the wheel (not illustrated). Accordingly, the sensor unit 200 can measure the wheel speed of a vehicle.

In this case, the sensor unit 200 of the sensor for detecting a change in the magnetic field 1 including the holder structure for a sensor 100 according to an exemplary embodiment of the present disclosure includes a sensor body 210 and a terminal 220.

An integrated circuit (IC) chip for measuring a change in the magnetic field is mounted on the sensor body 210.

The sensor body 210 may be formed in a rectangular shape having a predetermined thickness as illustrated in FIG. 2, but the shape is not limited.

In this case, the sensor body 210 may be formed asymmetrically left and right as illustrated in FIG. 2. For example, as illustrated in FIG. 2, an inclined surface 212 may be formed on one edge portion of the sensor body 210. Through this, a person who installs the sensor body 210 can distinguish the upper and lower surfaces of the sensor body 210.

The terminal 220 is formed to extend from one side of the sensor body 210. The terminal 220 supplies power to the sensor body 210 and enables the sensor body 210 and an external control unit (not illustrated) to be energized.

As illustrated in FIG. 2, the terminal 220 may be formed as a pair, but may be additionally formed as needed.

In this case, as illustrated in FIG. 2, a through hole 222 may be formed in the terminal 220. The through hole 222 is fastened to a terminal fixing protrusion 112 to be described below.

The position at which the through hole 222 is formed may be formed on side of the sensor body 210 of the terminal 220 as illustrated in FIG. 2, and when a plurality of terminals 220 are provided, each terminal 220 may be formed at a different location. However, the present disclosure is not limited thereto, and as illustrated in FIG. 2, a through hole may be formed at the same location for each terminal 220.

The cable 300 connects an external control unit (not illustrated) for controlling the sensor unit 200 and the sensor unit 200 to be energized. Accordingly, the control unit (not illustrated) may receive a signal measured by the sensor body 210. For this purpose, as illustrated in FIG. 2, a conductive wire 310 disposed in the cable 300 is attached to the terminal so as to be energized.

The number of cables 300 is provided to correspond to the number of terminals 220, and may be respectively coupled to each terminal 220. However, in the following description, for the convenience of description, it is described by defining that two cables 300 and two terminals 220 are formed as illustrated in FIG. 2.

As illustrated in FIG. 2, in the holder structure for a sensor 100, the sensor unit 200 and the cable 300 connected to the sensor unit 200 are seated and fixed. To this end, the holder structure for a sensor 100 of the sensor for detecting a change in the magnetic field 1 including the holder structure for a sensor 100 according to an exemplary embodiment of the present disclosure includes a body 110, a sensor unit seating part 120 and a cable seating part 130.

The body 110 is formed to extend in length as illustrated in FIG. 2. In this case, as illustrated in FIG. 2, the sensor unit 200 and the cable 300 are disposed on the upper surface of the body 110 in the longitudinal direction.

In this case, the sensor unit seating part 120 is formed on the front side of the body 110, and the sensor unit 200 is fixed to the body 110 while being seated in the sensor unit seating part 120.

Figure 3:
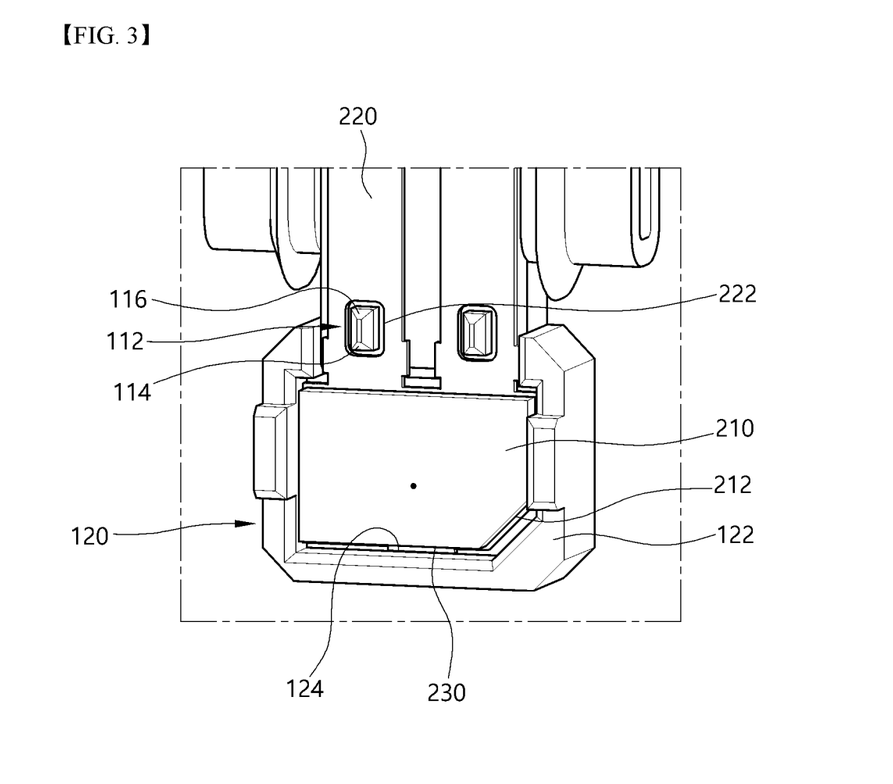
FIG. 3 is an enlarged view of the sensor unit seating part of the holder structure for a sensor according to an exemplary embodiment of the present disclosure.

In this case, a structure in which the sensor unit 200 is seated in the sensor unit seating part 120 will be described in detail with reference to FIG. 3. FIG. 3 is an enlarged view of the sensor unit seating part of the holder structure for a sensor according to an exemplary embodiment of the present disclosure.

As illustrated in FIG. 3, the holder structure for a sensor 100 of the sensor for detecting a change in the magnetic field 1 including the holder structure for a sensor 100 according to an exemplary embodiment of the present disclosure includes an edge wall 122, a body fixing protrusion groove 124 and a terminal fixing protrusion 112 such that the sensor unit 200 is stably seated and fixed.

As illustrated in FIG. 3, in the sensor unit seating part 120, the edge wall 122 is formed to protrude upward to surround the edge of the sensor body 210 of the sensor unit 200 disposed in the sensor unit seating part 120.

In this case, the edge wall 122 is formed to correspond to the shape of the sensor body 210 as illustrated in FIG. 3. That is, the sensor body 210 is formed to correspond to the inclined surface 212 formed on one edge portion.

Accordingly, when the sensor body 210 is disposed within the edge wall 122, when the upper and lower surfaces of the sensor body 210 are reversely disposed, the sensor body 210 cannot be inserted into the edge wall 122, and thus, it is possible to prevent defective products from being manufactured.

A body fixing protrusion groove 124 is formed on the inner surface of the front side of the edge wall 122. The body fixing protrusion 230 protruding from the sensor body 210 to the front side is inserted into the body fixing protrusion groove 124. The shape of the body fixing protrusion 230 is not limited, and the body fixing protrusion groove 124 is formed to correspond to the shape of the body fixing protrusion 230 such that the body fixing protrusion 230 is inserted and fixed.

Accordingly, the user determines the upper and lower surfaces of the sensor body 210 according to the edge wall 122, and disposes the sensor body 210 into the edge wall 122 while inserting the body fixing protrusion 230 into the body fixing protrusion groove 124.

Meanwhile, a terminal fixing protrusion 112 is formed to protrude from the upper surface of the body 110 on the rear side of the sensor unit seating part 120.

As the sensor body 210 is seated in the sensor unit seating part 120, the terminal 220 is disposed on the upper surface of the body 110, and the terminal fixing protrusion 112 is inserted into the through hole 222 formed in the terminal 220 such that the sensor body 210 is fixed in the edge wall 122.

The shape and position of the terminal fixing protrusion 112 is formed to correspond to the through hole 222.

In this case, the cross-sectional area of the terminal fixing protrusion 112 may be formed to become smaller toward the upper side of the terminal fixing protrusion 112 to facilitate insertion of the terminal fixing protrusion 112 into the through hole 222 while the body fixing protrusion 230 is inserted into the body fixing protrusion groove 124.

Accordingly, when the terminal fixing protrusion 112 is inserted into the through hole 222, the inner peripheral surface of the front side of the through hole 222 may be inserted into the through hole 222 along the front inclined surface 114 formed in the terminal fixing protrusion 112, and in addition, since the rear inclined surface 116 is formed, it is possible to prevent the inner peripheral surface of the rear side of the through hole 222 from being obstructed by the terminal fixing protrusion 112 when it moves.

The sensor unit 200 is fixed so as not to move vertically by the body fixing protrusion 230, and is seated in the sensor unit seating part 120 while being fixed so as not to move back and forth by the terminal fixing protrusion 112.

Meanwhile, on the rear side of the body 110, the cable seating part 130 is formed. That is, as the sensor unit 200 is seated in the sensor unit seating part 120, the cable 300 connected to the terminal 220 of the sensor unit 200 and disposed on the rear side is fixed to the body 110 while being seated in the cable seating part 130.

Figure 4:
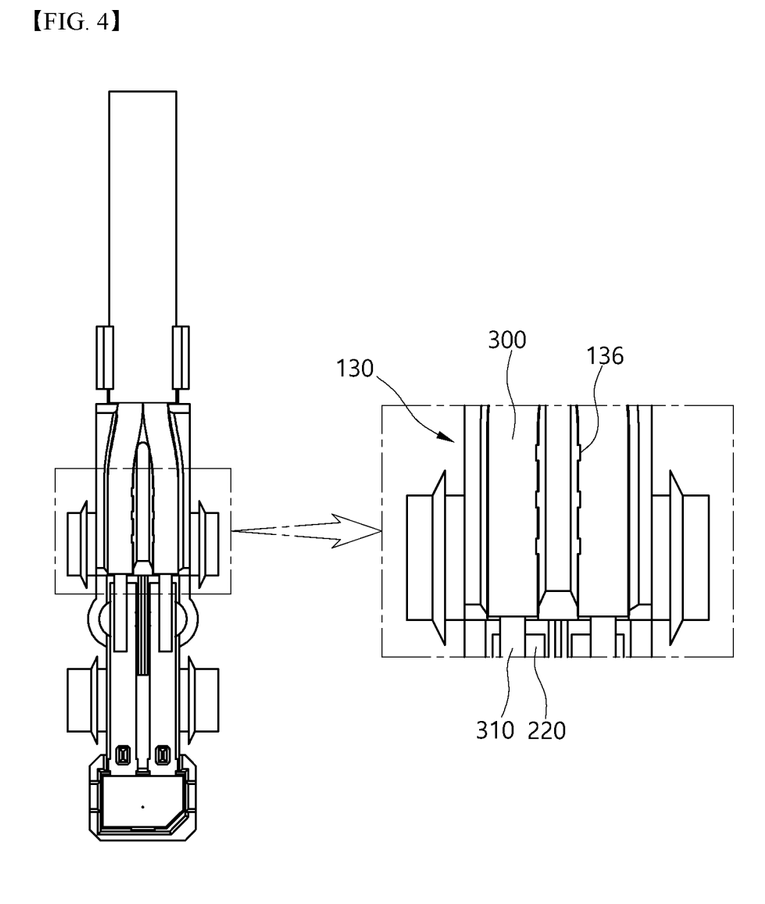
FIG. 4 is an enlarged view of the cable seating part of the holder structure for a sensor according to an exemplary embodiment of the present disclosure.

In this case, a structure in which the cable 300 is seated in the cable seating part 130 will be described in detail with reference to FIG. 4. FIG. 4 is an enlarged view of the cable seating part of the holder structure for a sensor according to an exemplary embodiment of the present disclosure.

As illustrated in FIG. 4, the cable seating part 130 of the sensor for detecting a change in the magnetic field 1 including the holder structure for a sensor 100 according to an exemplary embodiment of the present disclosure includes a side wall 132, a separation wall 134 and a cable fixing rib 136.

As illustrated in FIG. 4, the side wall 132 is formed to protrude upward from the upper surface of the body 110 and extends in the longitudinal direction of the body 110. In this case, the side walls 132 are formed as a pair to support the left and right sides of the cable 300.

In this case, the separation wall 134 is formed in the center of the pair of side walls 132 such that the pair of cables 300 respectively connected to the pair of terminals 220 may be supported. The separation wall 134 protrudes upward from the upper surface of the body 110 and extends in the longitudinal direction of the body 110 to be parallel to the side wall 132. Accordingly, as illustrated in FIG. 4, the cable 300 is seated between the side wall 132 and the separation wall 134 while being connected to the terminal 220.

In this case, the cable fixing rib 136 may be formed on the inner surface of the separation wall 134 or the side wall 132. The cable fixing rib 136 presses the left and right sides of the cable 300 disposed between the separation wall 134 and the side wall 132 such that it prevents the cable 300 from escaping between the separation wall 134 and the side wall 132.

The number of the cable fixing ribs 136 is not limited, and may be formed in different numbers according to the lengths of the side wall 132 and the separation wall 134.

Accordingly, the user seats the sensor unit 200 in the sensor unit seating part 120 and then seats the cable 300 coupled to the terminal 220 in the cable seating part 130, that is, between the separation wall 134 and the side wall 132. In this case, when the user presses the cable 300 to the lower side such that it abuts against the upper surface of the body 110, the cable 300 is firmly fixed by the cable fixing rib 136.

Meanwhile, the housing 400 is formed so as to surround the holder structure for a sensor 100 while the sensor unit 200 and the cable 300 are seated and fixed in the holder structure for a sensor 100. In this case, the housing 400 is formed by injection while the holder structure for a sensor 100 is fixed to a separate fixing member.

Figure 5:
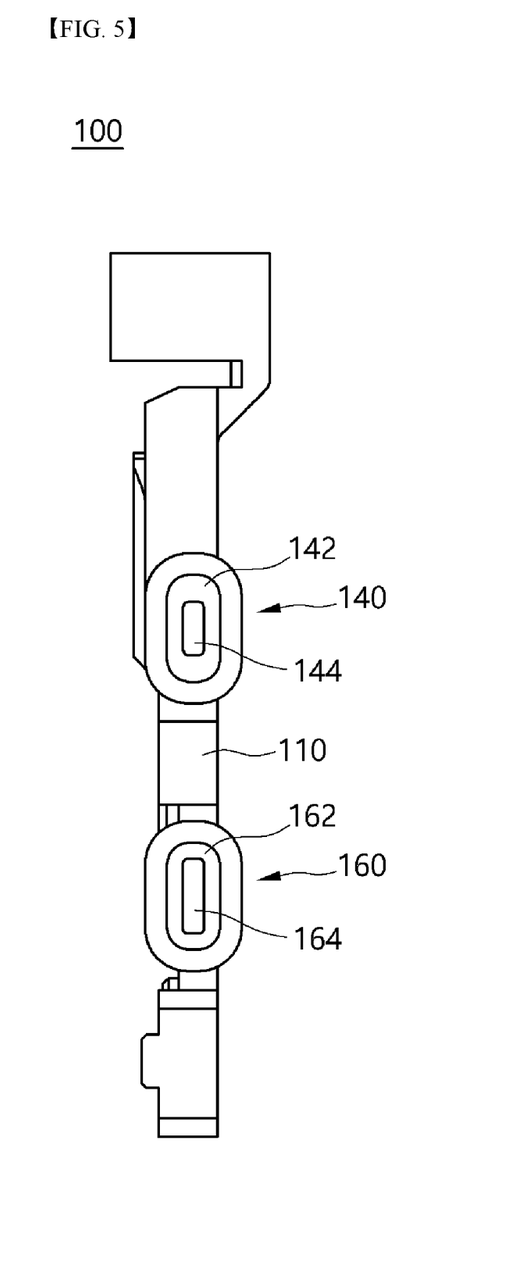
FIG. 5 is a right-side view of the holder structure for a sensor according to an exemplary embodiment of the present disclosure.
Figure 6:
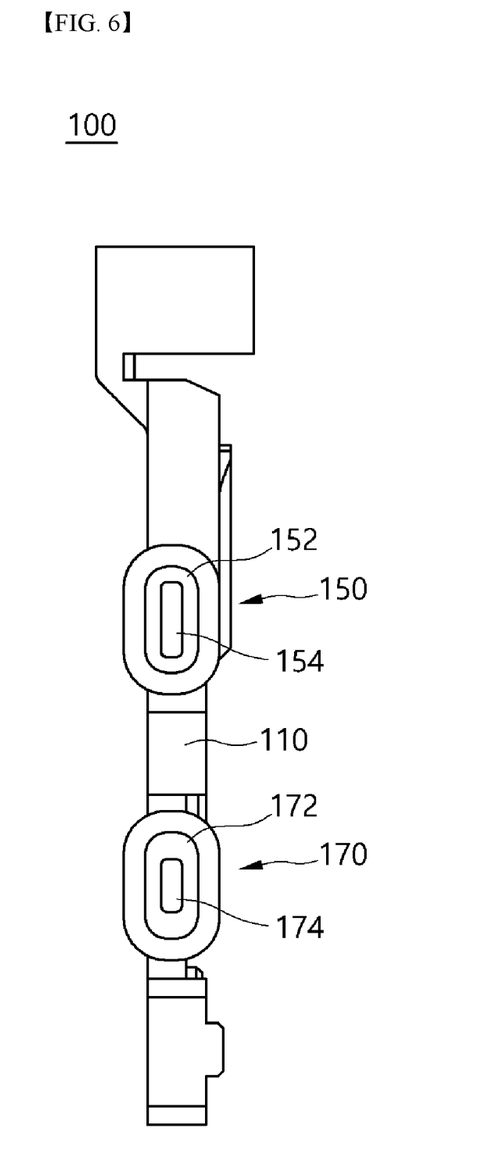
FIG. 6 is a left-side view of the holder structure for a sensor according to an exemplary embodiment of the present disclosure.

In this case, with reference to FIGS. 5 to 7, the configurations for forming the housing 400 by injection will be described in detail. FIG. 5 is a right-side view of the holder structure for a sensor according to an exemplary embodiment of the present disclosure. FIG. 6 is a left-side view of the holder structure for a sensor according to an exemplary embodiment of the present disclosure.

As illustrated in FIGS. 5 and 6, the holder structure for a sensor 100 of the sensor for detecting a change in the magnetic field 1 including the holder structure for a sensor 100 according to an exemplary embodiment of the present disclosure includes a first fixing part 140 and a second fixing part 150.

As illustrated in FIG. 5, the first fixing part 140 is formed on the right-side surface of the body 110 such that the holder structure for a sensor 100 can be fixed to the first fixing member 2 when the housing 400 is injected.

The first fixing member 2 coupled to the first fixing part 140 is formed to extend in the shape of a stick. The shape of the cross-section of the first fixing member 2 is not limited, and may have, for example, a rectangular cross-section as illustrated in FIG. 5.

When it is described more specifically, the first fixing part 140 of the sensor for detecting a change in the magnetic field 1 including the holder structure for a sensor 100 according to an exemplary embodiment of the present disclosure includes a first protrusion 142 formed to protrude from the right-side surface of the body 110, and a first groove 144 which is concavely formed toward the body on the front-end surface of the body.

The first groove 144 is formed in a shape corresponding to the cross-sectional shape of the first fixing member 2 such that the first fixing member 2 may be inserted.

As illustrated in FIG. 6, on the left side of the body 110 opposite to the right side on which the first fixing part 140 is formed, a second fixing part 150 is formed that can be fixed to the second fixing member 4.

Although the first fixing part 140 and the second fixing part 150 may be disposed to face each other as illustrated in FIG. 6, they are not necessarily disposed in this way.

The second fixing part 150 includes a second protrusion 152 formed to protrude from the left-side surface of the body 110 like the first fixing part 140, and a second groove 154 which is concavely formed toward the body 110 on the front-end surface of the second protrusion 152.

In this case, the second fixing member 4 is coupled to the second groove 154, and the second fixing member 4 is formed in the shape of a stick formed to extend like the first fixing member 2. The second groove 154 is formed in a shape corresponding to the cross-sectional shape of the second fixing member 4 such that the second fixing member 4 may be inserted.

However, the first fixing member 2 and the second fixing member 4 are formed to have different cross-sectional shapes. Accordingly, even if the left and right directions of the holder structure 100 for a sensor are changed, although the second fixing part 150 is disposed on the side of the first fixing member 2 and the first fixing part 140 is disposed on the side of the second fixing member 4, the second fixing member 4 may be inserted into the first fixing part 140 and the first fixing member 2 may not be coupled to the second fixing part 150.

Accordingly, when the housing 400 is formed by injection, it is possible to prevent the production of defective products by injection in a state where the direction where the holder structure for a sensor 100 is disposed inside the housing 400 is changed.

Meanwhile, as illustrated in FIGS. 5 and 6 in order to more firmly support the holder structure for a sensor 100 when the housing 400 is injected, the holder structure for a sensor 100 of the sensor for detecting a change in the magnetic field 1 including the holder structure for a sensor 100 according to an exemplary embodiment of the present disclosure may further include a third fixing part 160 and a fourth fixing part 170. However, in the descriptions of the third fixing part 160 and the fourth fixing part 170, the contents overlapping with the first fixing part 140 and the second fixing part 150 will be briefly described.

As illustrated in FIG. 5, the third fixing part 160 is spaced apart from the first fixing part 140 and is formed on the right side of the body 110. The third fixing part 160 is coupled to a third fixing member 6 disposed parallel to the first fixing member 2.

In this case, similar to the first fixing part 140, the third fixing part 160 may include a third protrusion 162 protruding from the right-side surface of the body 110 and a third protrusion 164 formed on the front-end surface of the third protrusion 162.

The third fixing member 6 is coupled to the third fixing part 160 by being inserted into the third groove 164 when the first fixing member 2 is coupled to the first fixing part 140.

In this case, the cross-sectional shape of the third groove 164 and the cross-sectional shape of the first groove 144 may be different from each other. Accordingly, when the housing 400 is injected, it is possible to prevent the holder structure for a sensor 100 from being erroneously disposed in the front-rear direction.

As illustrated in FIG. 6, the fourth fixing part 170 may be formed on the left-side surface of the body 110 to face the third fixing part 160, and include a fourth protrusion 172 protruding from the left-side surface of the body 110, and a fourth groove 174 formed on the front-end surface of the fourth protrusion 172. A fourth fixing member 8 disposed in parallel with the second fixing member 4 is inserted and fixed into the fourth groove 174.

In this case, similar to the third groove 164, in order to prevent the holder structure for a sensor 100 from being erroneously disposed in the front-rear direction when the housing 400 is ejected, the cross-sectional shape of the fourth groove 174 and the cross-sectional shape of the second groove 154 may be formed to be different from each other.

In addition, the cross-sectional shapes of the third groove 164 and the fourth groove 174 are formed to be different from each other, and accordingly, as described above, when the housing 400 is injected, it is possible to prevent the holder structure for a sensor 100 from being erroneously arranged.

A structure in which the first fixing member 2 to the fourth fixing member 8 are coupled to the holder structure for a sensor 100 will be described in detail with reference to FIGS. 7A and 7B. FIG. 7A is a view showing a state before the first to fourth fixing members are coupled to the holder structure for a sensor according to an exemplary embodiment of the present disclosure, and FIG. 7B is a view showing a state in which the first to fourth fixing members are coupled to the holder structure for a sensor according to an exemplary embodiment of the present disclosure.

Figure 7A:
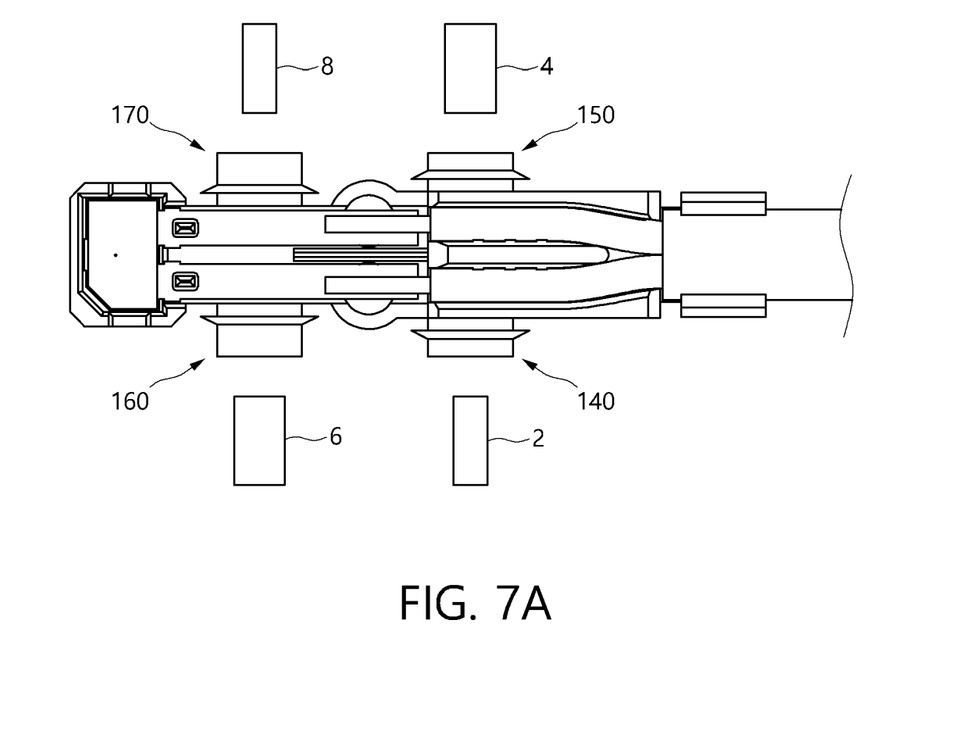
FIG. 7A is a view showing a state before the first to fourth fixing members are coupled to the holder structure for a sensor according to an exemplary embodiment of the present disclosure.

As illustrated in FIG. 7A, the first fixing member 2 and the third fixing member 6 are disposed on the lower side for fixing the holder structure for a sensor 100 before injection of the housing 400, and the second fixing member 4 and the fourth fixing member 8 are arranged on the upper side.

The first fixing member 2 to the fourth fixing member 8 are disposed perpendicular to the ground, as illustrated in FIG. 7A.

In this case, in the holder structure for a sensor 100, in which the injection of the housing 400 is scheduled, the first fixing part 140 and the third fixing part 160 are disposed above the first fixing member 2 and the third fixing member 6, and the second fixing part 150 and the fourth fixing part 170 are disposed under the second fixing member 4 and the fourth fixing member 8.

Figure 7B:
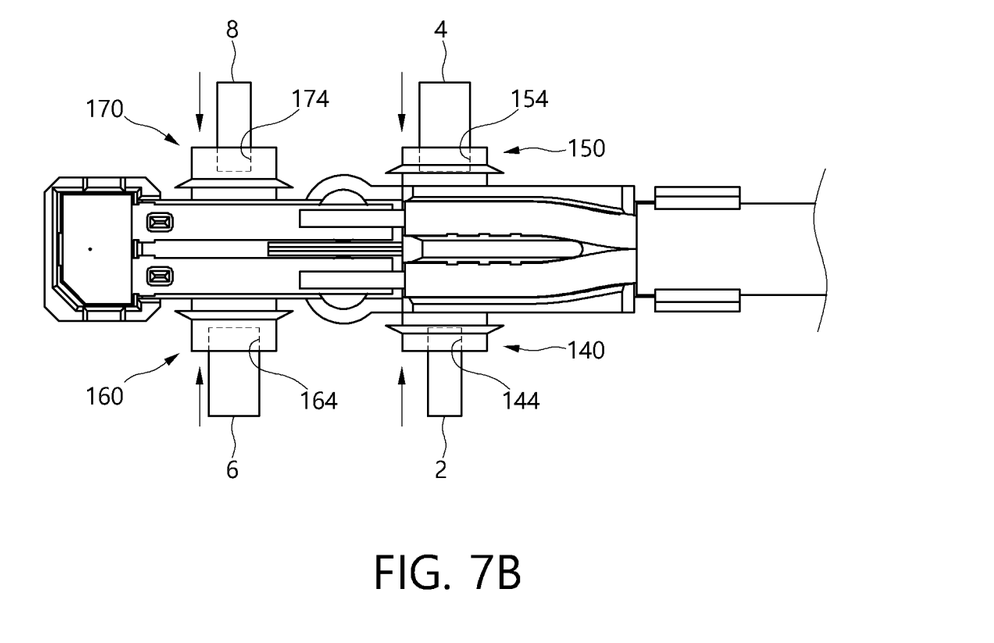
FIG. 7B is a view showing a state in which the first to fourth fixing members are coupled to the holder structure for a sensor according to an exemplary embodiment of the present disclosure.

As illustrated in FIG. 7B, the first fixing member 2 to the fourth fixing member 8 are respectively inserted and fixed to the first fixing part 140 to the fourth fixing part 170 for the injection of the housing 400.

In this case, when the direction in which the holder structure for a sensor 100 is disposed is changed, since the cross-sections of the first fixing part 140 to the fourth fixing part 170 and the cross-sections of the first fixing member 2 to the fourth fixing member 8 are formed to correspond to each other, the first fixing member 2 to the fourth fixing member 8 may not be coupled to the first fixing part 140 to the fourth fixing part 170.

As illustrated in FIG. 7B, when the first fixing member 2 to the fourth fixing member 8 are respectively inserted into the first fixing part 140 to the fourth fixing part 170, the housing 400 is formed by injection. Accordingly, the housing 400 capable of integrally enclosing the sensor unit seating part 120 in which the sensor unit 200 is seated and the cable seating part 130 in which the cable 300 is seated is formed (refer to FIG. 1).

After the housing 400 is formed, the first fixing member 2 to the fourth fixing member 8 are separated from the holder structure for a sensor 100.

Figure 8A:
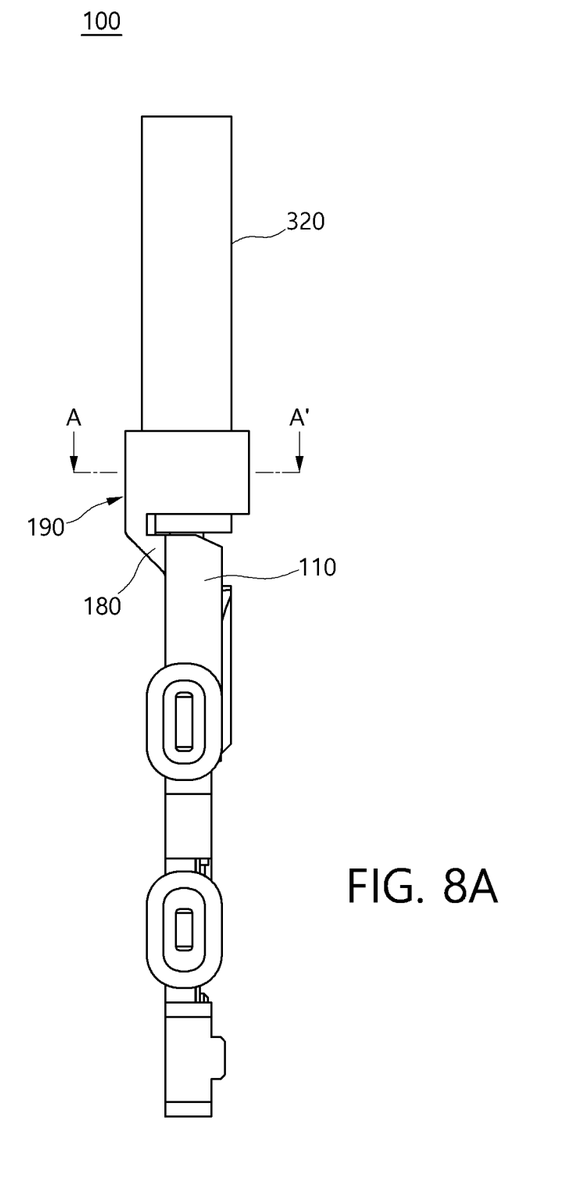
FIG. 8A is a side view showing a state in which the protection member is coupled to the fixing member of the holder structure for a sensor according to an exemplary embodiment of the present disclosure.
Figure 8B:
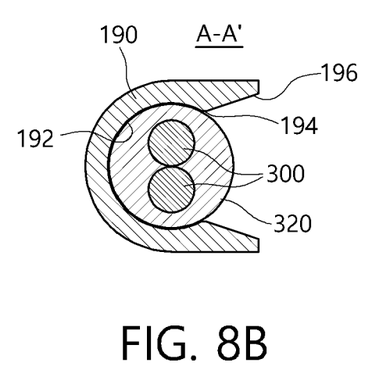
FIG. 8B is an enlarged cross-sectional view along line A-A' of FIG. 8A.

FIG. 8A is a side view showing a state in which the protection member is coupled to the fixing member of the holder structure for a sensor according to an exemplary embodiment of the present disclosure, and FIG. 8B is an enlarged cross-sectional view along line A-A' of FIG. 8A.

As illustrated in FIG. 8A, the holder structure for a sensor 100 according to an exemplary embodiment of the present disclosure may further include a protection member fixing member 190. The protection member fixing member 190 fixes the protection member 320 for protecting a pair of cables 300 to the other side of the body 110.

In this case, as illustrated in FIG. 8B, the protection member 320 may be a covering for a type formed to surround a pair of cables 300 in order to physically protect the pair of cables 300 from the outside and prevent the pair of cables from being left in a divided state.

The protection member fixing member 190 may fix the protection member 320 by surrounding the outer peripheral surface of the protection member 320 formed such that the pair of cables 300 is disposed therein. Accordingly, the outer surface of the protection member 320 and the inner peripheral surface 192 of the protection member fixing member 190 are coupled while being in contact.

As illustrated in FIG. 8A, one side of the protection member fixing member 190 may be formed to be opened such that the protection member 320 may be coupled to the protection member fixing member 190.

In this case, the direction in which one side of the protection member fixing member 190 is opened may be formed to coincide with the direction in which the above-described cable 300 is seated in the cable seating part 130. Accordingly, when coupling the cable 300 to the holder structure for a sensor 100, the user may couple to the holder structure for a sensor 100 more easily by pressing the cable 300 and the protection member 320 surrounding the cable 300 in the same direction.

As illustrated in FIG. 8A, the holder structure for a sensor 100 according to an exemplary embodiment of the present disclosure may include a joint 180 to arrange the protection member fixing member 190 on the other side of the body 110.

As illustrated in FIG. 8A, the joint 180 is connected to the protection member fixing member 190 by protruding from the other side surface of the body 110 such that the protection member fixing member 190 may be disposed to be spaced apart from the body 110. In this case, the body 110, the joint 180 and the protection member fixing member 190 may be integrally formed.

Since the joint 180 is provided, the protection member fixing member 190 may elastically support the protection member 320 through the joint 180.

Meanwhile, as illustrated in FIG. 8B, the protection member fixing member 190 of the holder structure for a sensor 100 according to an exemplary embodiment of the present disclosure may further include a protection member fixing protrusion 194 and a guide surface 196 formed on the protection member fixing protrusion 194.

The protection member fixing protrusions 194 are formed as a pair and protrude inward from both ends of the protection member fixing member 190 on the open side.

As the protection member fixing protrusion 194 is formed, it is possible to prevent the protection member 320 from being inserted into the open side of the protection member fixing member 190 and separated from the protection member fixing member 190 in a fixed state.

In this case, a guide surface 196 is formed on the open side of the protection member fixing member 190 on each of the pair of protection member fixing protrusions 194. The guide surface 196 may be formed as an inclined surface such that the user may guide the protection member 320 to the open side of the protection member fixing member 190 when the user couples the protection member 320 to the protection member fixing member 190.

Accordingly, the user may easily push the protection member 320 along the guide surface 196 to one side of the opened protection member fixing member 190, even if the protection member 320, which is relatively thicker than the cable, does not precisely correspond to the protection member fixing member. In addition, the user may more easily seat the relatively thin cable 300 in the cable seating part 130 in a state where the protection member 320 is coupled to the protection member fixing member 190.

As described above, the holder structure for a sensor 100 according to an exemplary embodiment of the present disclosure includes the first fixing part 140 to the fourth fixing part 170 having grooves with different cross-sections such that when the first fixing part 140 to the fourth fixing part 170 are coupled to the first fixing member 2 to the fourth fixing member 8, the user may confirm the direction, and thus, when the housing is injected, the holder structure for a sensor is arranged in the same direction inside the housing so as to reduce the production of defective products. In addition, since the holder structure for a sensor 100 according to an exemplary embodiment of the present disclosure includes the cable seating part 130 and the protection member fixing member 190 such that the cable 300 may be firmly coupled without being separated, and also, by including the protection member fixing member 190 on which the guide surface 196 is formed, the protection member 320 may be more easily coupled to the holder structure for a sensor 100.

In the above, the holder structure for a sensor according to an exemplary embodiment of the present disclosure and a sensor for detecting a change in the magnetic field including the same have been described, but the holder structure for a sensor and the sensor for detecting a change in the magnetic field including the same according to the present exemplary embodiment are not applicable only to a wheel speed sensor, and those of ordinary skill in the art to which the present disclosure pertains will clearly understand that a sensor unit that can be used in various fields can be disposed inside the housing and used as a fixed sensor.

As described above, the preferred exemplary embodiments according to the present disclosure have been described, and the fact that the present disclosure may be embodied in other specific forms without departing from the spirit or scope of the present disclosure in addition to the above-described exemplary embodiments is apparent to those having ordinary skill in the art. Therefore, the above-described exemplary embodiments are to be regarded as illustrative rather than restrictive, and accordingly, the present disclosure is not limited to the above description, but may be modified within the scope of the appended claims and their equivalents.

[Explanation of Reference Numerals]

1: Sensor for detecting change in magnetic field
2: First fixing member
4: Second fixing member
6: Third fixing member
8: Fourth fixing member
100: Holder structure for a sensor
110: Body
112: Terminal fixing protrusion
114: Front inclined surface
116: Rear inclined surface
120: Sensor unit seating part:
122: Edge wall
124: Body fixing protrusion groove
130: Cable seating part
132: Side wall
134: Separation wall
136: Cable fixing rib
140: First fixing part
142: First protrusion
144: First groove
150: Second fixing part
152: Second protrusion
154: Second groove
160: Third fixing part
162: Third protrusion
164: Third groove
170: Fourth fixing part
172: Fourth protrusion
174: Fourth groove
180: Joint
190: Protection member fixing member
192: inner peripheral surface
194: Protection member fixing protrusion
196: Guide surface
200: Sensor unit
210: Sensor body
212: Inclined surface
220: Terminal
222: Through hole
230: Body fixing protrusion
300: Cable
310: Conductor
320: Protection member
400: Housing

The invention claimed is:

1. A holder structure for a sensor, in which a sensor unit is seated on one end and a pair of cables connected to the sensor unit are seated on the other end, the holder structure comprising:
a body which is elongated;
a sensor unit seating part formed at one end of the body in the longitudinal direction such that the sensor unit is seated;
a cable seating part formed at the other end of the body in the longitudinal direction such that the pair of cables connected to the sensor unit to be energized are seated;
a first fixing part having a first protrusion formed to protrude, in a lateral direction, from one side of the body, and a first groove concavely formed, toward an opposite side of the body opposite to the one side of the body, on a front-end surface of the first protrusion; and
a second fixing part having a second protrusion formed to protrude, in an opposite lateral direction, from the opposite side of the body, and a second groove concavely formed, toward the one side of the body, on a front-end surface of the second protrusion and having a cross-section which is different from the cross-section of the first groove.

2. The holder structure of claim 1, wherein the sensor unit comprises a sensor body, a pair of terminals formed to extend from one side of the sensor body to which the pair of cables are respectively connected, and a through hole formed in the terminals, and
wherein the body comprises a terminal fixing protrusion formed to protrude from one side such that the sensor unit is seated in the sensor unit seating part while being coupled to the through hole.

3. The holder structure of claim 2, wherein the sensor unit further comprises a body fixing protrusion formed to protrude from the other side of the sensor body, and
wherein the sensor unit seating part comprises an edge wall formed to surround the edge of the sensor body and a body fixing protrusion groove formed in the edge wall such that the sensor unit can be seated with the body fixing protrusion inserted.

4. The holder structure of claim 3, wherein the sensor body is formed asymmetrically, and
wherein the edge wall is formed to correspond to the asymmetric shape of the sensor body such that the sensor body can be seated in the sensor unit seating part only in one direction.

5. The holder structure of claim 1, wherein the cable seating part comprises a pair of side walls protruding from the body and extending in the longitudinal direction of the body, and a separation wall protruding from the body to be disposed in the center of the pair of side walls and extending in the longitudinal direction, and
wherein the separation wall comprises a plurality of cable fixing ribs formed to protrude from both sides toward the pair of side walls.

6. The holder structure of claim 1, wherein the cable seating part comprises a pair of side walls protruding from the body and extending in the longitudinal direction of the body, and a separation wall protruding from the body to be disposed in the center of the pair of side walls and extending in the longitudinal direction, and
wherein the pair of side walls comprises a plurality of cable fixing ribs formed to protrude from the inner side toward the separation wall.

7. The holder structure of claim 1, further comprising:
a protection member fixing member for fixing a protection member formed to surround the pair of cables with one end of the pair of cables exposed to the outside to the other side of the body.

8. The holder structure of claim 7, wherein the protection member fixing member is opened in a direction where the cable is seated such that the protection member is seated in the protection member fixing member in a direction where the cable is seated in the cable seating part.

9. The holder structure of claim 8, wherein the protection member fixing member further comprises a pair of protrusions protruding inward from both ends of the open side of the protection member fixing member.

10. The holder structure of claim 9, wherein a guide surface for guiding the protection member toward the open side of the protection member fixing member is formed on the pair of protrusions.

11. The holder structure of claim 1, further comprising:
a third fixing part having a third protrusion spaced apart from and parallel with the first protrusion and formed to protrude, in the lateral direction, from the one side of the body, and a third groove concavely formed, toward the opposite side of the body, on a front-end surface of the third protrusion; and
a fourth fixing part having a fourth protrusion spaced apart from and parallel with the second protrusion and formed to protrude, in the opposite lateral direction, from the opposite side of the body, and a fourth groove concavely formed, toward the one side of the body, on a front-end surface of the fourth protrusion and having a cross-section which is different from the cross-section of the third groove.

12. A sensor for detecting a change in the magnetic field, comprising:
a sensor unit for detecting a change in the magnetic field;
a pair of cables connected to the sensor unit to be energized;
a holder structure for a sensor in which the sensor unit and the pair of cables are seated; and
a housing in which the holder structure for a sensor is disposed,
wherein the holder structure for a sensor comprises:
a body which is elongated;
a sensor unit seating part formed at one end of the body in the longitudinal direction such that the sensor unit is seated;
a cable seating part formed at the other end of the body in the longitudinal direction such that the pair of cables are seated;
a first fixing part having a first protrusion formed to protrude, in a lateral direction, from one side of the body, and a first groove concavely formed, toward an opposite side of the body opposite to the one side of the body, on a front-end surface of the first protrusion; and
a second fixing part having a second protrusion formed to protrude, in an opposite lateral direction, from the opposite side of the body, and a second groove concavely formed, toward the one side of the body, on a front-end surface of the second protrusion and having a cross-section which is different from the cross-section of the first groove.

13. The sensor of claim 12, wherein in the housing, an end of a first fixing member extending in length and having a cross-section corresponding to the cross-section of the first groove portion is coupled to the first fixing part and extending in length, and an end of the second fixing member having a cross-section corresponding to the cross-section of the second groove is formed by injection while being coupled to the second fixing part.

14. The sensor of claim 12, wherein the holder structure for a sensor further comprises:
a third fixing part having a third protrusion spaced apart from and parallel with the first protrusion and formed to protrude, in the lateral direction, from the one side of the body, and a third groove concavely formed, toward the opposite side of the body, on a front-end surface of the third protrusion; and
a fourth fixing part having a fourth protrusion spaced apart from and parallel with the second protrusion and formed to protrude, in the opposite lateral direction, from the opposite side of the body, and a fourth groove concavely formed, toward the one side of the body, on a front-end surface of the fourth protrusion and having a cross-section which is different from the cross-section of the third groove,
wherein in the housing, a first fixing member extending in length and having a cross-section corresponding to the first groove is coupled to the first fixing part, and a second fixing member extending in length and having a cross-section corresponding to the second groove is coupled to the second fixing part, and a third fixing member spaced apart from the first fixing member and extending in length and having a cross-section corresponding to the third groove is coupled to the third fixing portion, and a fourth fixing member spaced apart from the second fixing member and extending in length and having a cross-section corresponding to the fourth groove is formed by injection while being coupled to the fourth fixing member.

15. The sensor of claim 12, wherein the sensor unit measures the wheel speed of a vehicle.

* * * * *